United States Patent [15] 3,673,353

Tiemann et al. [45] June 27, 1972

[54] MAGNETIC TRANSDUCER HAVING A COMPOSITE MAGNETIC CORE STRUCTURE

[72] Inventors: Jerome J. Tiemann, Schenectady, N.Y.; Louis G. Gitzendanner, Oklahoma City, Okla.

[73] Assignee: General Electric Company

[22] Filed: July 16, 1970

[21] Appl. No.: 55,362

[52] U.S. Cl. ....................................................179/100.2 C

[51] Int. Cl...........................................G11b 5/16, G11b 5/24

[58] Field of Search...........................179/100.2 C, 100.2 A; 340/174.1 F; 346/74 MC

[56] References Cited

UNITED STATES PATENTS

| | | | |
|---|---|---|---|
| 3,171,107 | 2/1965 | Rogers, Jr. | 179/100.2 C |
| 3,057,967 | 10/1962 | Clark | 179/100.2 C |
| 2,963,690 | 12/1960 | Holman | 179/100.2 C |

*Primary Examiner*—Bernard Konick
*Assistant Examiner*—Alfred H. Eddleman
*Attorney*—Richard R. Brainard, Paul A. Frank, Charles T. Watts, Frank L. Neuhauser, Oscar B. Waddell and Joseph B. Forman

[57] ABSTRACT

A magnetic transducer for read-write applications is disclosed in which the magnetic circuit comprises a stack of laminations of generally "C" shape having a read-write winding inductively associated therewith. The read-write gap is provided by the opposed ends of the stacked laminations, and the laminations are of two different types; that is, they have different magnetic characteristics and are preferably of different materials. The outer laminations have relatively low initial permeability relative to the remaining laminations so that they are ineffective during the read operation but have sufficiently low coercive force so that they are magnetized during the write operation. The inner laminations of the stack have relatively high initial permeability so that they are magnetized during the read operation. In this way, the effective height of the stack and, accordingly, the width of the read-write gap is narrower during the reading operation than it is during the writing operation, being essentially equal to the total stack for writing and essentially equal to the inner laminations for reading.

2 Claims, 3 Drawing Figures

Inventors:
Jerome J. Tiemann,
Louis G. Gitzendanner,
by Richard R. Brainard
Their Attorney.

MAGNETIC TRANSDUCER HAVING A COMPOSITE MAGNETIC CORE STRUCTURE

The present invention relates to an improved transducer and particularly to a read-write head having improved characteristics for the read-write functions.

It is desirable from the standpoint of circuit requirements of the system to provide a single gap in the magnetic head for both the read and write functions. However, some difficulties are experienced due to the different requirements during these two operations and, in particular, it is desirable to read only the central portion of the previously written track. This is desirable because it avoids pick-up of erroneous data that was not completely over-written during the write operation. This problem is due to misalignments that result from a number of effects such as thermal expansions, spindle runout, positional tolerances, and the like which tend to result in displacements of the transducer with respect to the data track. In the past in systems using a single read-write gap, some separate means has been employed to insure that the edges of the track or guard bands have been erased. In one modification, a tunnel erase gap is provided which completely erases a guard band on either side of the recorded information, thereby assuring that no extraneous pick up will take place.

It is an important object of the present invention to provide an effectively narrower gap for the reading operation than for the writing operation in a single gap head which is otherwise of more conventional structure, that is, it consists of a stack of laminations of open or "C" shape having a single read-write gap in one leg thereof and having laminations which are of uniform width but the outer ones of which have such magnetic characteristics that they are not effective during the reading operation.

Further objects and advantages of the present invention will become apparent as the following description proceeds, reference being had to the accompanying drawing and the scope will be pointed out in the appended claims.

Figures 1, 2, 3:
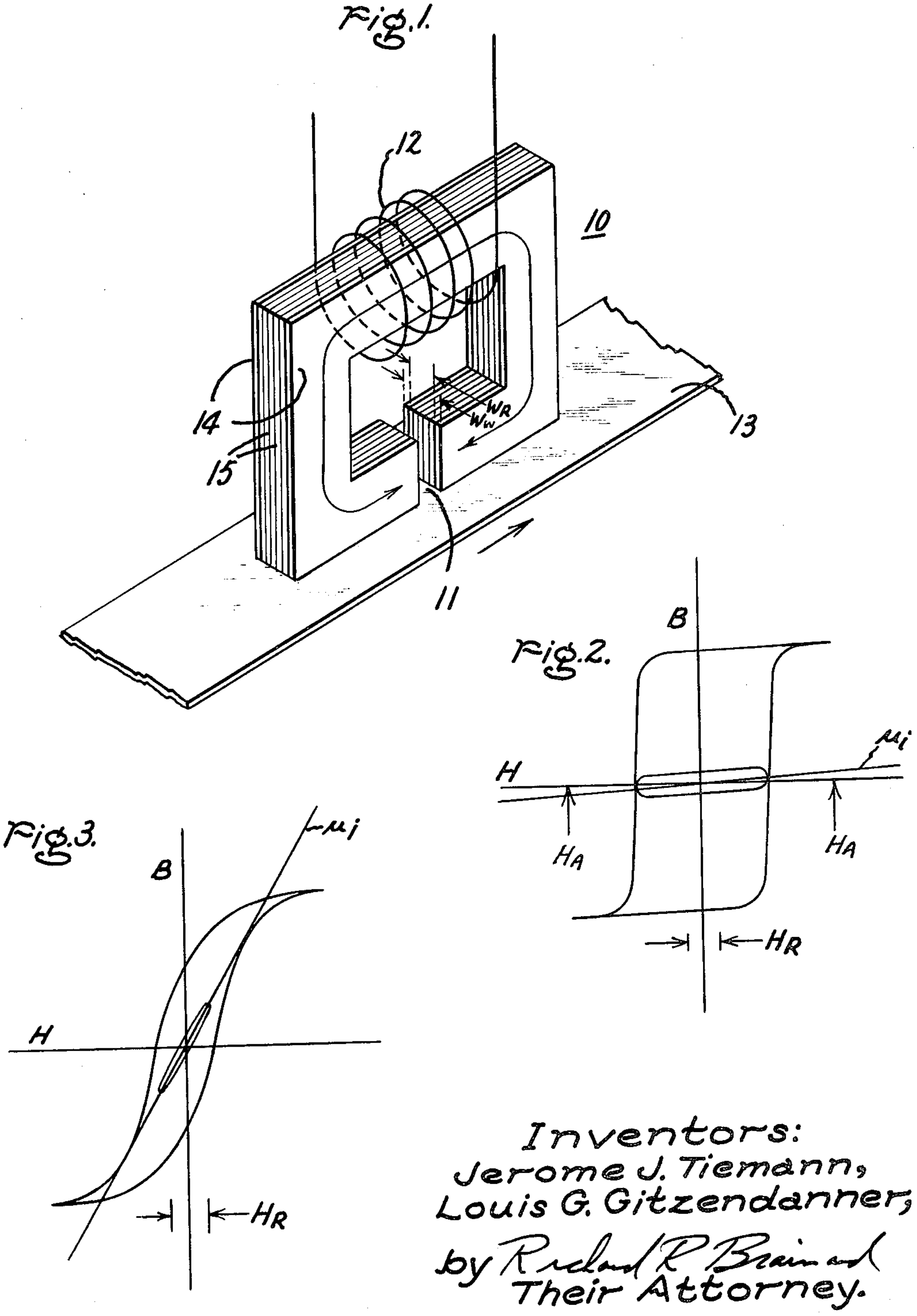
FIG. 1 is an isometric view of a read-write head embodying the present invention.
FIG. 2 illustrates schematically the magnetic characteristics of the outer laminations.
FIG. 3 is a schematic representation of the magnetic characteristics of the inner laminations.

In the drawing, the invention is illustrated as embodied in a read-write head 10 of substantially conventional configuration in that it is made up of a stack of laminations providing a substantially closed magnetic circuit, which may be termed rectangular or "C" shaped and having a gap in one leg defined by the opposed ends of that leg. The write signals are applied to a coil or conductive means inductively associated with the core and, as shown, are wound on the leg opposite the leg in which the gap is formed. As will be readily appreciated, read signals are generated in this same coil. In use, the head is mounted, as shown in the drawing, in closely spaced relation to the recording or memory medium so that the flux fringing the gap penetrates the medium. The length of the gap, that is, the dimension between the adjacent ends of the opposed leg portions, is in the direction of relative movement between the head and the medium and the laminations of the stack have the edges thereof directed toward the surface of the medium.

In accordance with important features of the present invention, the effective width of the gap in a direction parallel to the width of the stack of laminations and, accordingly, in the direction of the width of the track on the medium with which it cooperates is different for the write operation than it is for the read operation. This is accomplished by providing the core with laminations 14 on the top and bottom of the stack which are ineffective magnetically during the read operation. These laminations are of a material having a relatively low initial permeability but of sufficiently low coercive force so that they are magnetized by the write current. The permeability at the levels of flux produced during reading is sufficiently small that the effective width of the gap is the width of the central stack of laminations 15. Thus, the width of the gap is the full thickness of the stack of laminations $W_W$ during the write operation and has a width equal to the central stack of laminations $W_R$ during the read operation.

The difference in magnetic characteristics for the inner and outer laminations may be produced entirely by the anisotropy of the material employed for the outer laminations in which the easy axis of magnetization is parallel to the length of the magnetic circuit while the inner or read laminations are essentially isotropic. The characteristics of the outer or write laminations are illustrated schematically in FIG. 2 in which the variation of flux density with magnetomotive force is shown with the maximum magnetomotive force applied during write designated $H_A$. The minor loop or small signal magnetic characteristic is shown as a small loop about the origin with the slope of this loop being the initial permeability small $\mu_i$ of the write laminations. Similar characteristics are shown in FIG. 3 for the isotropic material and it will be noted that the initial permeability $\mu_i$ is much greater and produces substantial magnetization in response to the relatively small magnetomotive force induced by the field of the recording medium and indicated as $H_R$. The material employed may be any one of the materials which exhibit substantial anisotropy such as magnetically annealed permalloy. An alloy of 60 to 70 percent nickel and 40 to 30 percent iron may be used effectively.

While it is possible to obtain the desired effect by using the same composition for all the laminations but changing the orientation of the easy axis of magnetization for the two different laminations types, i.e. the outer laminations should be annealed so that the easy axis is parallel to the direction of the magnetic circuit, whereas the central laminations should be essentially isotropic. It may be preferable to use different magnetic alloys which exhibit substantially different properties to enhance the desired effect. The outer laminations may be, for example, cobalt-iron alloys having substantially 95 percent by weight of cobalt and 5 percent by weight of iron. The central laminations may to advantage be formed of an iron-nickel alloy having a composition, for example, of 15 percent by weight of iron and 85 percent by weight of nickel. It is apparent that these compositions are not critical and are illustrative of readily-available alloys which give the different characteristics discussed above to inherently change the effective width of the gap under the conditions existing during the read and write operations.

Since the material of the outer laminations tends to retain magnetization after a period of writing, it is desirable to essentially eliminate this residual magnetization by terminating the write process with a signal having a succession of current reversals of diminishing amplitudes or increasing frequency. This will have a beneficial affect on the performance of the head during reading and also will prevent the residual magnetization which might otherwise be present from affecting the recorded data during the reading operation.

The present invention utilizes a very simple electrical and mechanical structure. All of the laminations are of the same size and at the same time the difficulties resulting from variations in exact registry of a head in its position relative to the medium during the read and write operations are avoided. The expression "C" shape used to define the shape of the core is used in its broadest sense to include any substantially closed magnetic circuit having an air gap therein which may be positioned adjacent the recording medium and coupled thereto by flux which fringes the gap at the edge adjacent the medium.

What we claim as new and desire to secure by Letters Patent of the United States is:

1. In a read-write head, a magnetic core comprising a stack of laminations providing a magnetic circuit with an uninterrupted read-write gap of substantially uniform width in one leg of said core defined by opposed ends of the laminations in said one leg, conductor means inductively coupled to said core, said head being adapted for mounting in operative relation to a recording medium with the leg including said gap in closely spaced relation to the medium with the flux fringing the lower edge of said gap penetrating said medium and with the edge of said laminations facing said medium, the outside laminations of said stack being constructed of a material having low initial permeability relative to the remaining laminations so that the outside laminations are ineffective during the read operation and have a sufficiently low coercive force so that they are magnetized during the writing operation, the inner laminations of the core being constructed of material having relatively high initial permeability so that they are magnetized during the read operation, thus providing a read-write gap having an effective width equal to the full stack dimension during the write operation and a width equal to the stack of inner laminations for the read operation.

2. The read-write head of claim 1 in which the outer or write laminations are oriented with the easy axis of magnetization parallel to the length of the magnetic circuit.

* * * * *